United States Patent
Eng et al.

(10) Patent No.: US 6,810,008 B2
(45) Date of Patent: Oct. 26, 2004

(54) IMMEDIATE REROUTING IN DATA NETWORKS

(75) Inventors: Kai Y. Eng, Atlantic Highlands, NJ (US); Jon Anderson, Brielle, NJ (US)

(73) Assignee: Park Technologies, LLC, Eatontown, NJ (US)

(*) Notice: Subject to any disclaimer, the term of this patent is extended or adjusted under 35 U.S.C. 154(b) by 905 days.

(21) Appl. No.: 09/734,364

(22) Filed: Dec. 11, 2000

(65) Prior Publication Data

US 2001/0038480 A1 Nov. 8, 2001

Related U.S. Application Data

(63) Continuation-in-part of application No. 09/565,727, filed on May 5, 2000.
(60) Provisional application No. 60/234,122, filed on Sep. 21, 2000.

(51) Int. Cl.[7] .......................... G01R 31/08; H04L 12/28
(52) U.S. Cl. ..................... 370/216; 370/255; 370/401; 398/1
(58) Field of Search ............................. 370/254, 352, 370/356, 216, 255, 401; 398/1, 5

(56) References Cited

U.S. PATENT DOCUMENTS

| | | | | |
|---|---|---|---|---|
| 4,825,206 A | * | 4/1989 | Brice et al. | 340/825.02 |
| 5,159,595 A | | 10/1992 | Flanagan et al. | 370/85.15 |
| 5,530,575 A | * | 6/1996 | Acampora et al. | 359/128 |
| 5,953,338 A | | 9/1999 | Ma et al. | 370/395 |

* cited by examiner

Primary Examiner—Duc Ho
(74) Attorney, Agent, or Firm—Kaplan & Gilman, LLP

(57) ABSTRACT

A data network routing apparatus and method are presented. The data switch comprises a packet engine integrated with an optical engine. The optical engine and packet engine are under common software and/or hardware control, and communicably interconnected. As a result, the physical state of the optics is continually and immediately available to the packet engine, in substantially real time. The packet engine implements a routing algorithm which operates on at least the data traffic in the network and the optical transport topology. The routing apparatus periodically updates the routing algorithm's operands under normal operation, and in the event of the failure of a communications link in the network, the routing apparatus immediately updates the routing algorithm operands in response. A network comprising a plurality of nodes with such immediate rerouting capability is achieved by utilizing a plurality of the disclosed data switches as its nodes.

8 Claims, 6 Drawing Sheets

IMMEDIATE REROUTING IN DATA NETWORKS

CROSS REFERENCE TO OTHER APPLICATIONS

This application claims the benefit of U.S. Provisional Application No. 60/234,122, filed on Sep. 21, 2000, and also claims the benefit of the U.S. Provisional Application filed on Nov. 30, 2000, entitled "Optical Flow Networking", naming Kai Y. Eng as Inventor. Additionally, this application is a continuation-in-part of U.S. application Ser. No. 09/565,727, filed on May 5, 2000, the disclosure of which is incorporated herein by this reference in its entirety.

TECHNICAL FIELD

This invention relates to data networks, and, in particular, to an improved technique of routing data in a data network utilizing optical transport means.

BACKGROUND OF THE INVENTION

Optical fiber networks, such as SONET, are in widespread use due to their ability to support high bandwidth connections. The bandwidth of optical fibers runs into gigabits and even terabits. Optical links can thus carry hundreds of thousands of communications channels multiplexed together. Optical fiber networks are subject to outages if and when breaks in the fibers occur. A cut in a single fiber between two network nodes could conceivably render communications along certain nodes of the system impossible. Moreover, because each fiber carries so many independent voice and/or data channels, a large number of communications sessions would be interrupted.

In a conventional packet switched data network, packets are multiplexed onto high speed connections between packet data switches. These switches are, at the data level, routers, such as the CISCO family of routers well known in the art. The routers output the data packets to a physical transport level constructed out of optical fibers and equipment to propagate the optical signals along them. Such optical transport equipment is commonly known, as, for example, that manufactured and sold by Lucent Technologies and Nortel Networks. A portion of such a network is shown in FIG. 1, which includes four exemplary routers (R), 101, 102, 120 and 121, and a network of transport equipment nodes (TE) 103–106. Each router feeds into the transport network. Although the data layer and the physical layer exchange the data packets through each other, these layers are not integrated, and are each operated as discrete and autonomous entities. Each packet switch reads the address header in packets to be routed through the network, and interprets the required information for transmission from one switch to the next. It then hands the packet to the physical layer for transport—according to the then prevailing "assumptions" the router makes about the transport layer's topology.

The connections between the packet switches are often extremely high speed, and carry a relatively large number of multiplexed packets. If a fiber is cut or a communications channel damaged in some other way, then a large volume of data would be cut off. Since the router, or data, layer of the network does not recognize a "fiber cut", and only deduces its existence from the failure of a number of packets to acknowledge having arrived at the intermediate node, this information is not available to the router for some minutes. Accordingly, it is required, in order to insure reliability, that such networks have some way of recovering from cut fibers and/or other loss of data channel capability.

In one conventional method, a redundancy route (i.e. a backup route) and a primary route are provided. When an interruption occurs on the primary route somewhere between a source node and a destination node, the packet data is routed from the source node to the destination node over the backup route. Such recovery techniques usually do not provide for the isolation of the problem along a particular portion of the route. Rather, if communications between two switches fail, a new route is used.

Even though the interruption may only occur along a length of the primary route between two adjacent nodes, the whole primary route is replaced by the backup route for transmitting the packet data from the source node to the destination node. This is not optimal because the operable portions of the route are not used during the fault. Thus, the network effectively operates at 50% capacity in order to ensure backup capability.

Other conventional methods attempt to provide for backup communications links without duplicating each and every link, by distributing the diverted data packets along various other routes. While allowing operation at greater than 50% capacity, this approach inevitably increases packet latency, as more packets are required to be carried along the distributed backup links than is optimal.

FIG. 2 illustrates the occurrence of such a fiber cut along link 212. This link connects routers R1 201 and R2 202. Illustrating the first option described above, there is a backup link 220 running between the same transport network nodes as link 212, TE 203 and TE 205. As described above, since this link 220 is only used if link 212 has failed, it is essentially wasted most of the time.

FIG. 2 also depicts the implementation of the second option offered by the prior art. Links 221 and 222 depict the distributed rerouting of packets formerly sent along link 212. Link 222 has a pathway over link 214, through TE 206, and over link 215, to destination transport node TE 205. Similarly, link 221 runs along link 210 to intermediate TE node 204, then along link 211 to the destination transport node TE 205. In the situation illustrated in FIG. 2, there are no routers connected to transport network nodes 204 and 206, just transport network switches, such as optical cross connects. Thus, packets cannot be switched at these nodes by intelligent switches, so the backup routes 221 and 222 to router R2 202 must be pre-provisioned at router R1 201. To do this requires running (a) additional links from R1 201 to TE 203, shown in FIG. 2 as dotted links 231 and 232, as well as (b) additional links from R2 202 to TE 205, shown in FIG. 2 as dotted links 241 and 242. Ports associated with these additional links must be created, and dedicated, to these links as well. Further, these additional links must be provided with backup or protection themselves, further increasing cost and complexity.

It should be noted that links 221 and 222 do not physically exist, as they are mere depictions of the traffic that used to run along link 212 now running along the described two hop pathways within the transport network. As described above, this method does not waste as much bandwidth as a fully redundant backup link, but it can cause latency, and in times of heavy loading even loss of packets, if traffic along the two hop pathways is already at or near full capacity.

Besides the wasting of valuable bandwidth, the increase of packet latency and required links between routers and the transport network, or some compromise of the two, the conventional method introduces needless complexity. The calculation of the primary and the backup data paths, being divorced from the real time changes to the actual transport network is always, at best, an approximation of the optimal routing of packets through the network. This approximation is then mapped onto the actual transmission equipment. When a communications link in the physical transport network fails, as described above, the optics senses the fiber cut relatively immediately. However, since the routers cannot be apprised of this fact, the calculated backup path or paths are used. The mapping of these paths onto the physical transport layer of the network requires administrative overhead.

In view of the above, there exists a need in the art for a more efficient technique for dealing with communication link failures in the physical layer of data networks. Such a method would reduce the wasted bandwidth, increased latency, and administrative overhead which is ubiquitous in the various solutions used in the current art. Such a method would integrate the near immediate detection of a fiber cut available in the transport layer with the decision making routing processes operative in the data layer.

SUMMARY OF THE INVENTION

An object of the present invention is to provide a technique for immediately detecting the failure of a communications link in a data network, and communicating said communications link failure in substantially real time to the routers utilized in the network.

Another object is to provide a technique that immediately communicates, in substantially real time, after such a communications link failure, the revised transport network topology to the routers.

Another object of the invention is to provide a more efficient technique of backing up faulty communications channels in a multiple node packet data network by immediately rerouting the data packets.

According the present invention, packet data is transmitted from a source node to a destination node over a plurality of intermediate nodes. Each internodal hop occurs via a communications link. When a communications link fails (e.g. a cut in the optical fiber occurs) between a first and second nodes, this fact, and the resultant revised network topology, is immediately communicated to the routers for the appropriate rerouting of network data.

In a preferred embodiment, each network node is comprised of an edge switch. The edge switch comprises a packet engine connected to a packet switched data network, and an optical engine connected to an optical transport network, where the packet engine and the optical engine are under common hardware or software control, and where the optical engine continually communicates the topology of the optical transport network to the packet engine substantially in real time.

BRIEF DESCRIPTION OF THE DRAWINGS

The above and further advantages and features will be clearer from the following detailed description of a preferred embodiment of the present invention with reference to the drawings, in which.

DETAILED DESCRIPTION OF THE PREFERRED EMBODIMENT

Figure 3:
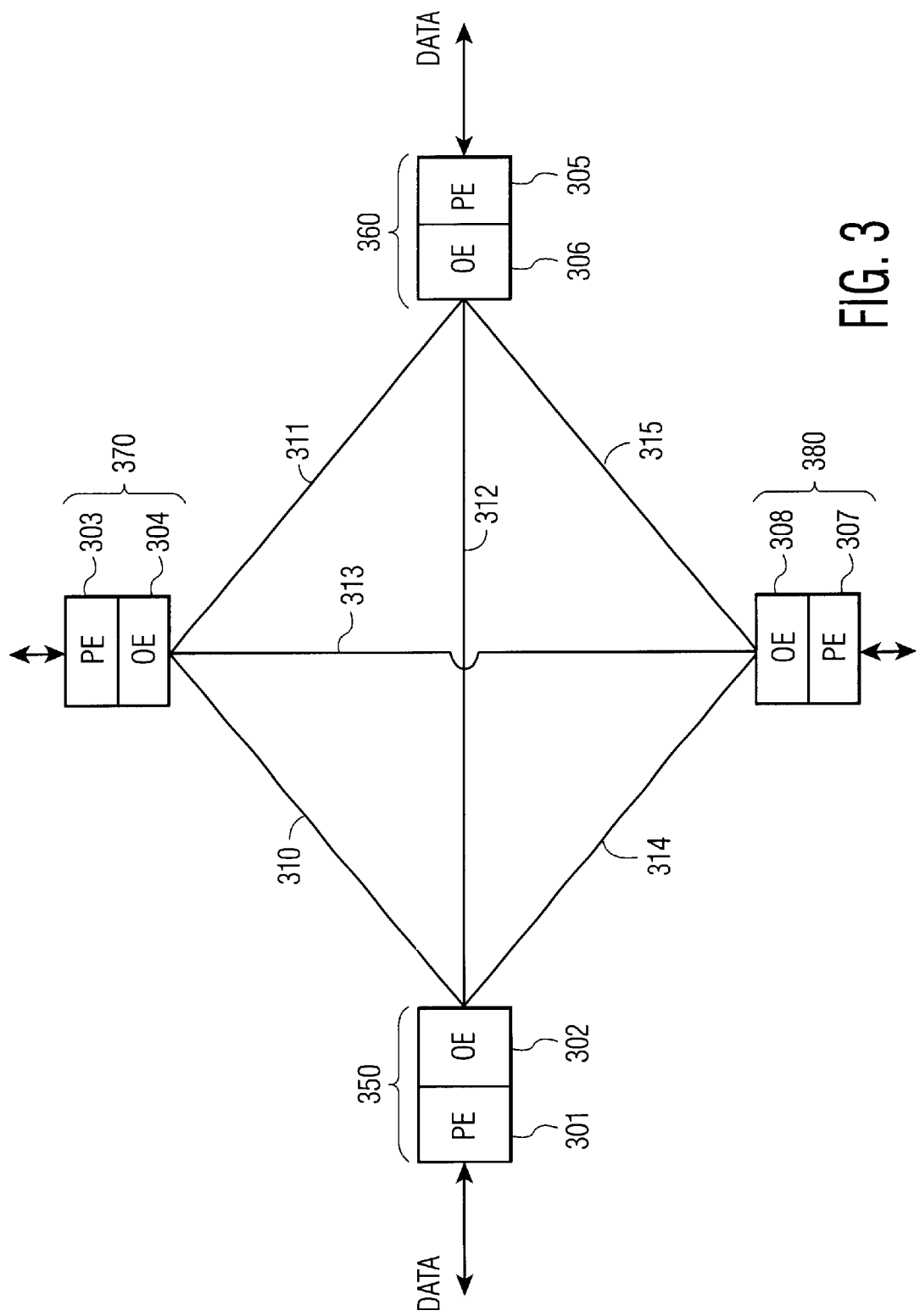
FIG. 3 depicts a data network of a preferred embodiment of the present invention.

Reference is made to FIG. 3 in which a preferred embodiment of the present invention is illustrated.

Figure 1:
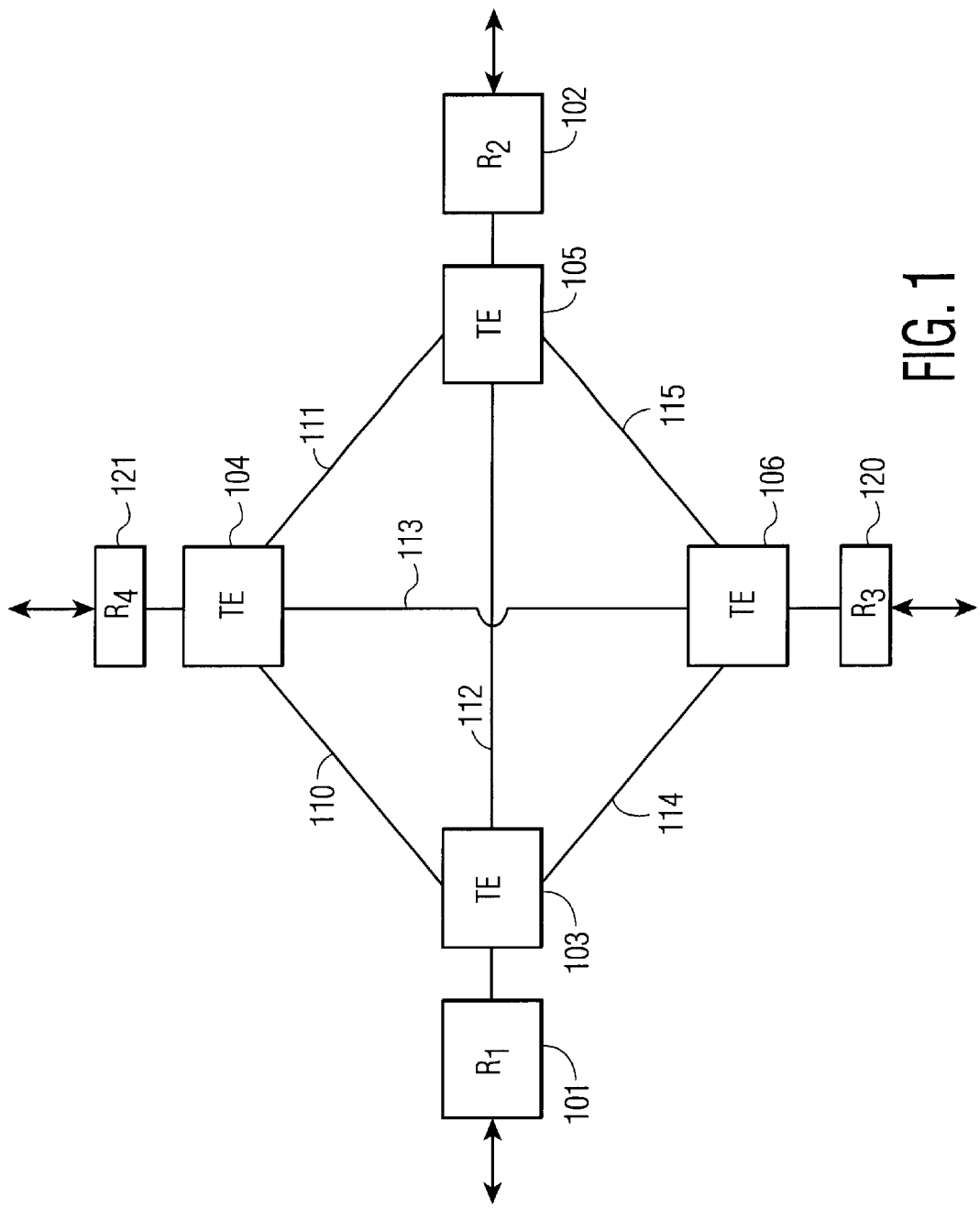
FIG. 1 is a conceptual diagram of routers and optical transport equipment in a prior art data network arrangement.
Figure 2:
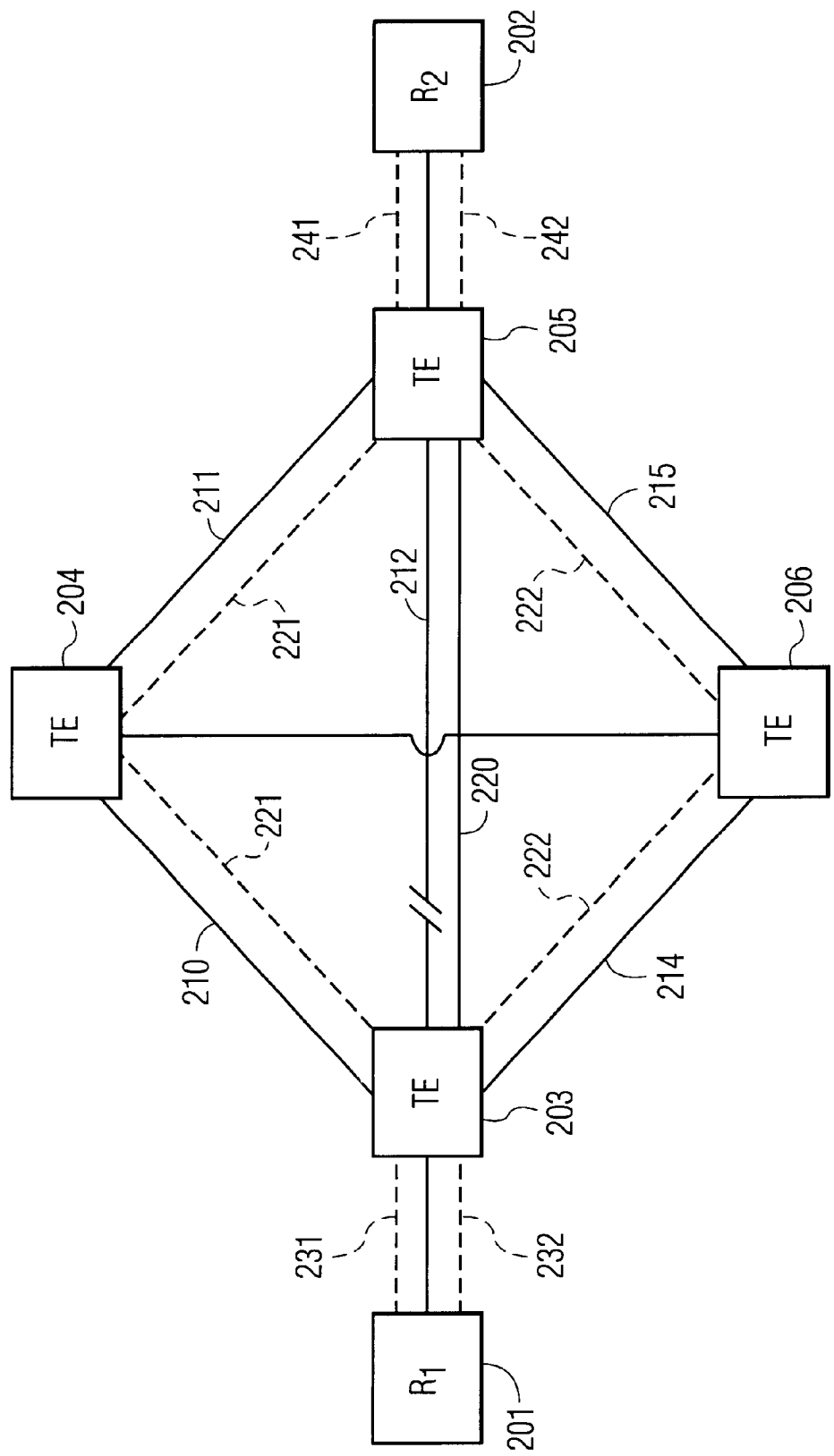
FIG. 2 shows the data network of FIG. 1 where a fiber cut has occurred.

FIG. 3 depicts essentially the same network connections as was shown in FIG. 1. With reference to FIG. 3, we see a difference from the prior art, however. Each of the nodes of the network is now composed of an integrated switch consisting of a packet engine (PE) and an optical engine (OE). For example, the left most node shows an integrated switch in which packet engine 301 and optical engine 302 are provided. Data enters and exits each node of the network via the packet engine and the integrated switch processes the data packets and outputs them to the optical engine side of the switch for entry into the physical transport layer of the network.

The physical transport layer of the network is an optical fiber network and is represented in FIG. 3 by links 310–315 connecting the various depicted nodes. Because the integrated switch is, in fact, integrated, whatever information the optical engines have by virtue of being connected to the optical transport layer regarding the topology and traffic in the optical transport layer is immediately available to the packet engine side of the integrated switch in substantially real time.

Because the integrated switch interfaces between the data layer and the transport layer of the data network, it shall termed, for purposes of this discussion, an edge switch. The edge switch as a whole is depicted as nodes 350 and 360 in FIG. 3. The packet engines 301, 303, 305 and 307 contained in the various nodes of the depicted network in FIG. 3 contain routers. The routers implement a routing algorithm which operates on at least two operands. These two operands are the data traffic in the network, and the actual physical topology of the transport layer of the network. The routing algorithm can be implemented at any time desired, and its operation and the operation of the optical engine side of the edge switch under common hardware and/or software control. Generally, the routing algorithm will be updated periodically, at a period T set by the network operators optimized to best route the network with the smallest expenditure of computing overhead and energy.

The network topology of the optical transport layer of the network can include at least whether a given link is functional or cut, as well as more subtle metrics. Some of these would include, for example, the physical properties of interest of a given link, such as whether it is not cut completely, but damaged, or, where there is some random condition effecting the light transmission and internal reflection properties of the link due to temperature, stray noise, or other electromagnetic interaction.

With reference FIG. 3, assume, for example, that a data packet is desired to be sent from node 350 to node 360 in the network. There is a direct link 312 between these two nodes and there are indirect links using either of nodes 370 and 380 as an intermediate node. Depending upon the data traffic and queues at the various nodes 350, 360, 370 and 380, the routing algorithm will either send the data packet along the direct link 312 or along one of intermediate links, such as, for example, 310 to node 370 and then along 311 to the destination node 360.

Figure 4:
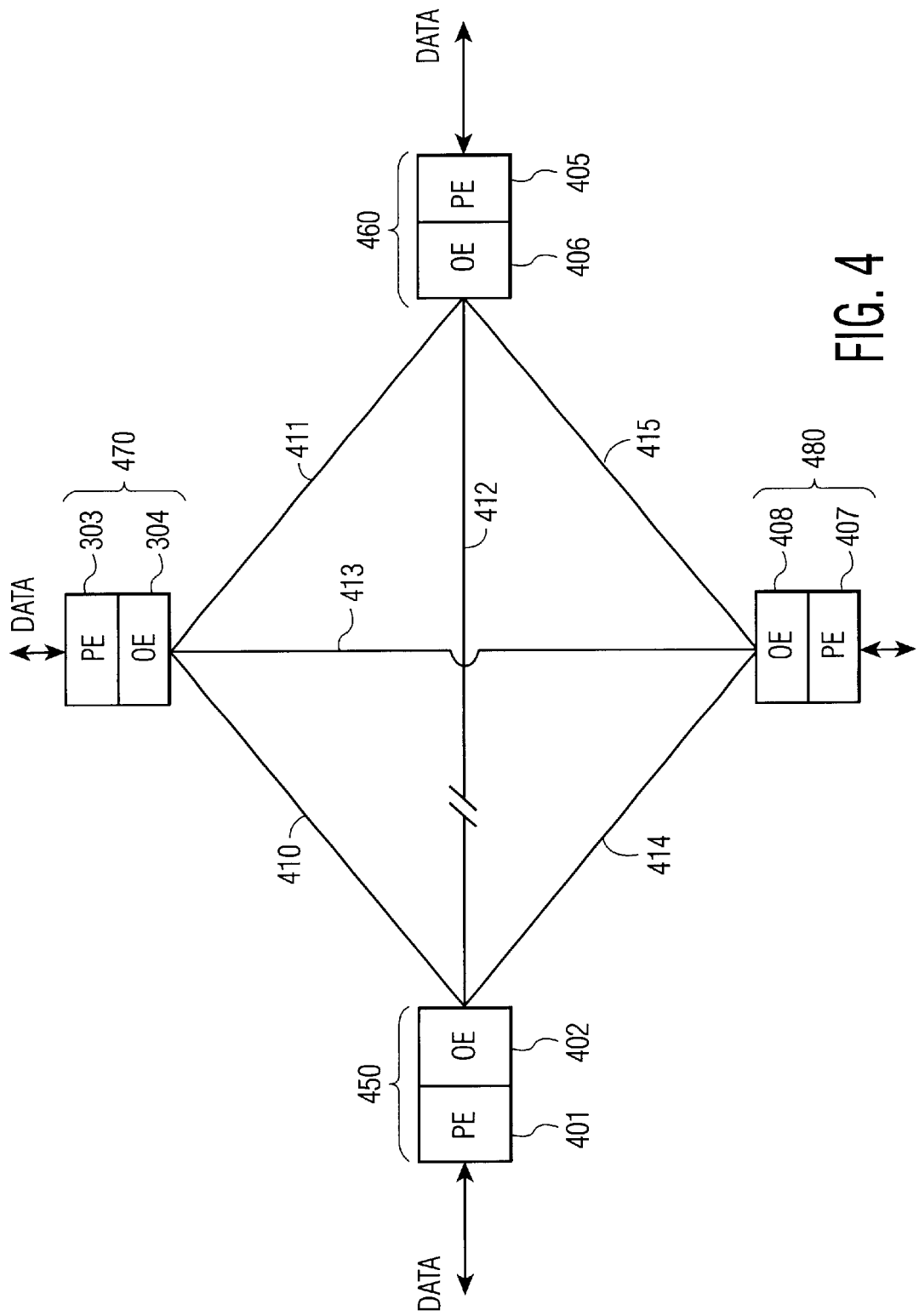
FIG. 4 depicts the data network of FIG. 3 where a fiber cut has occurred.

With reference to FIG. 4, the handling of a failed communications link, or fiber cut in the optical transport layer, of a preferred embodiment of the present invention will be described. Depicted in FIG. 4, is a cut link 412 running between nodes 450 and 460. As in FIG. 3, node 450 is comprised of an integrated edge switch containing a packet engine 401 which interfaces with the data layer of the network and an optical engine 402 which interfaces and is connected to the optical transport layer of the network. When the failure to link 412 occurs, that information is immediately available in the optical transport layer of the network.

Because the optical engines 402 and 406 are connected to the optical transport layer of the network, that information is immediately available to them as well. Because these optical engines are integrated as part of the same edge switch with the packet engines 401 and 405, respectively, that information is now immediately available to the packet engines and thus, the data layer of the network as well. It is in the packet engines 401 and 405, respectively, that the routers of nodes 450 and 460 reside. These routers implement a routing algorithm, as described above, which is periodically updated with the physical transport layer topology as well as the data traffic in the network.

The routers and the routing algorithm they implement, is also updated immediately upon the occurrence of a communications link failure or fiber cut in the optical transport layer. While the signal path for notifying the packet engine of this fact is not shown in the simplified depiction of the integrated edge switches 450 and 460, such a signaling method is well known in the art given the fact that the optical engine and the packet engine are integrated in a single integrated optoelectronic device under common hardware or software control and in constant communication. What happens at this point in time relative to the fiber cut is wholly unique. Instead of the optical transport layer, on its own, according to a preprogrammed map of primary and back-up links, or according to a set of completely redundant fail-safe type links (which require operating the network at only a 50% capacity, as described above) dealing with the fiber cut, and then waiting the several minutes it takes for the recognition of the fiber cut at the autonomous data layer so that the routers can dynamically reroute the data, the routers immediately, upon the sensing of a communications link failure, or fiber cut, simply reroute the entire network. The rerouting is done as if the now failed communications link was never there to begin with. From the perspective of the routing algorithm, a fiber cut has not occurred, but rather, a new network topology has been submitted to it for routing and queuing in the best available optimization.

While the implementation of just one of the edge switches of the preferred embodiment of the present invention as a node in an existing data network will afford its advantages to such a network, the benefits of the edge switch of the preferred embodiment of the present invention, and the optimizing immediate rerouting it facilitates increase dramatically with numbers. Thus, the implementation of an entire network using the edge switch disclosed herein is a natural extension of the preferred embodiment of the present invention.

Figure 5:
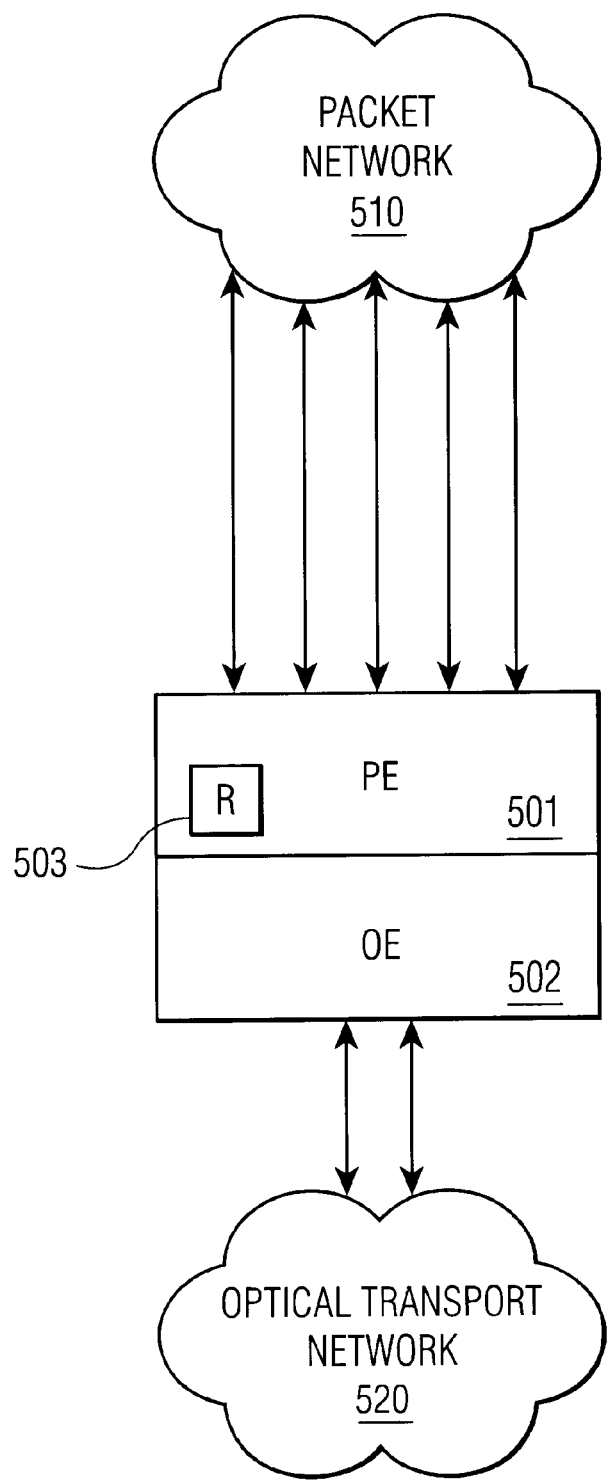
FIG. 5 depicts the edge switch of a preferred embodiment of the present invention.

FIG. 5 details the edge switch of the preferred embodiment of the present invention. With reference thereto, the packet network 501 depicts the data layer, and 520 the optical transport layer. New data initially enters the switch via the packet network 501, where it has been ultimately created by some application in some device, and has subsequently entered the network. Packet data at this layer is transmitted in electronic form. Data in the optical transport network 520 is encoded in optical signals, and comes from other nodes in the network. The edge switch is so termed because it interfaces between the two networks, much like a amphiphoteric molecule interfaces between hydrophobic and hydrophilic elements in a chemical system. It comprises a packet engine 501, and an optical engine 502. The packet engine (PE) further comprises the routing means 503 which implements the routing algorithm. The routing algorithm operates on data, such as a communications link failure, which is detected in the optical engine (OE) 502 and communicated to the PE 501 in substantially real time. This interfacing of the edge switch allows the collapse of the wasteful and inefficient administrative overhead ubiquitous in current data networks, as will be next described.

Figure 6A:
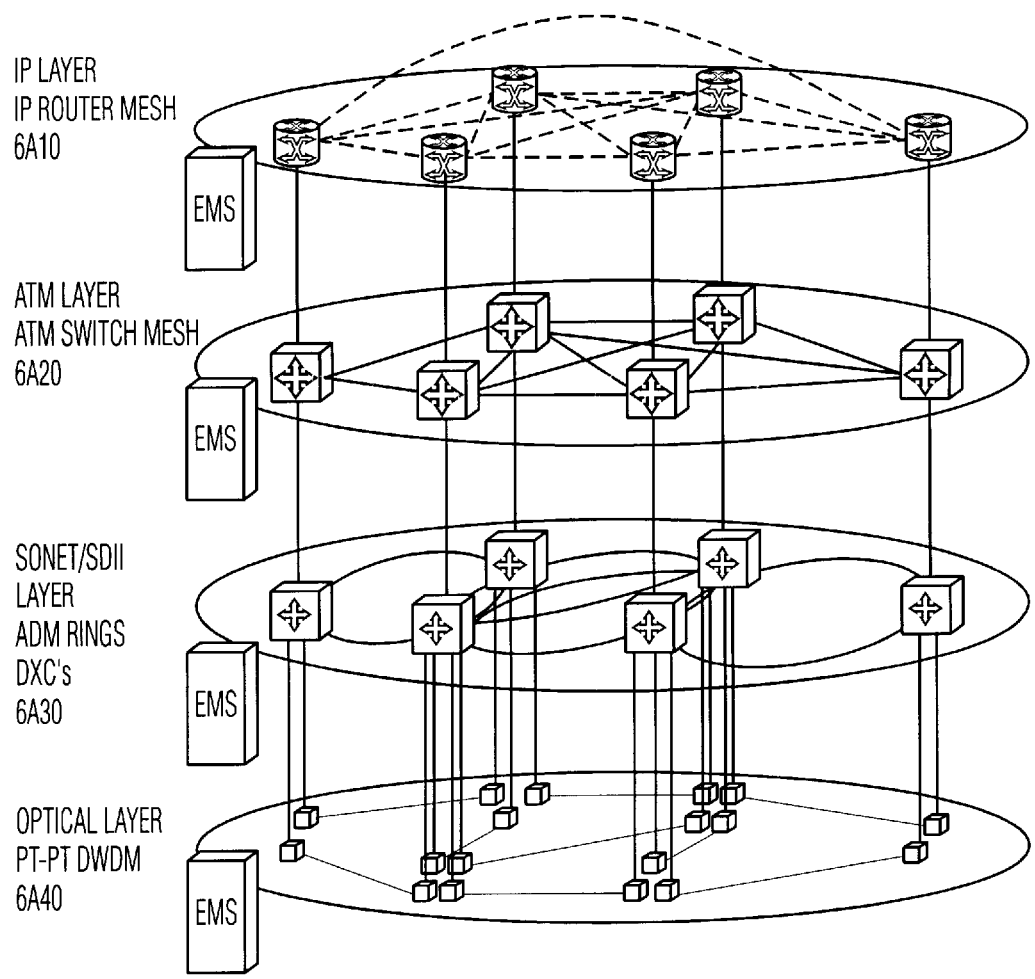
FIGS. 6A and 6B illustrate a comparison between the overhead and multi-layering of a prior art network and a network comprising utilizing the preferred embodiment of the present invention as its nodes.
Figure 6B:
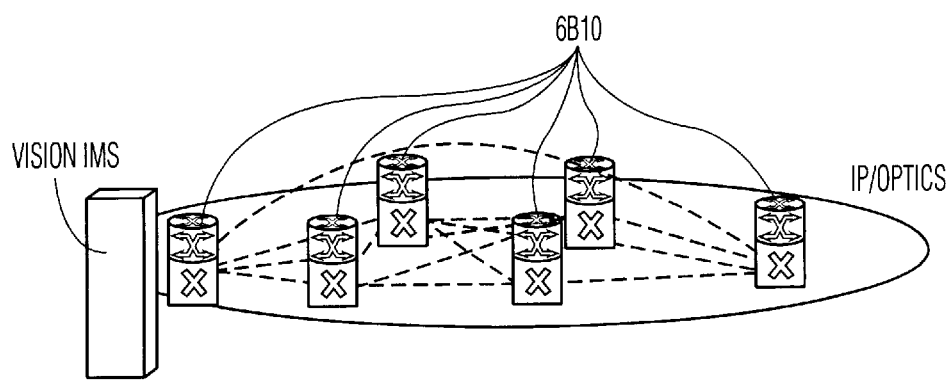

With reference to FIGS. 6A and 6B, FIG. 6A shows the multi-layering currently used in state of the art data networks utilizing optical transport means. The Internet Protocol Layer 6A10 interfaces with the electronic sources of the data, and is where data first enters the network. FIG. 6A depicts an IP over ATM scheme, where the IP packets are transmitted over an ATM network 6A20 as ATM cells, so as to allow the use of the ATM advantages, such as quality-of-service and delay guarantees. The ATM switches map to a SONET/SDH layer 6A30 which serves as the transport network, utilizing time division multiplexing, and managing the bandwidth as SONET/SDH frames. Finally, The Optical Layer 6A40 is utilized to transmit the data using dense wave division multiplexing, or DWDM. Not only does each layer require planning and coordination to interface with the layers above and below it, but there is overhead, management, multiplexing, provisioning, and protection, all with various resource costs, added with each layer. A better solution is shown in FIG. 6B which obviates the complexity of a four layer architecture.

FIG. 6B depicts the integrated single layer architecture of the preferred embodiment of the present invention. The IP and optical layers have been effectively collapsed into a single layer which combines the intelligence of IP with the scalable capacity of multi-wavelength optics. There is a single integrated edge switch 6B10, where conditions of the optics are continually available to the IP packet switches for use in their intelligence and control functionalities. Constructing a network as depicted in FIG. 6B results in significant efficiencies, realized, among many advantages, in the immediate rerouting capabilities described above.

While the above describes the preferred embodiment of the invention, various other modifications and additions will be apparent to those skilled in the art. Therefore, the scope of invention is intended to be covered by the following claims.

What is claimed:

1. An edge switch for use in a data network utilizing optical transport, comprising:

a packet engine connected to a packet switched data network; and an optical engine connected to an optical transport network, where the packet engine and the optical engine are under common hardware or software control, and where the optical engine continually communicates the topology of the optical transport network to the packet engine substantially in real time.

2. The edge switch of claim 1, where the packet engine further comprises routing means.

3. The edge switch of claim 2, where said routing means implements a routing algorithm, and
 where said routing algorithm operates on at least the data traffic in the network and the said optical transport network topology.

4. The edge switch of claim 3, where said routing means updates the operands of the routing algorithm:
 periodically under normal operation; and
 immediately in the event of a failure of a communications link of said optical transport network.

5. An edge switch for use in a data network utilizing optical transport, comprising:
 a packet engine comprising a router connected to a packet switched data network; and
 an optical engine connected to an optical transport network,
 where the packet engine and the optical engine are under common hardware or software control, and
 where said router updates the operands of a routing algorithm:
 periodically under normal operation; and
 immediately in the event of a failure of a communications link of said optical transport network.

6. The edge switch of claim 5, where said routing algorithm has as operands at least the data traffic in the network, and the transport network topology.

7. The edge switch of claim 6, where said data network comprises a data layer and an optical transport network.

8. The edge switch of claim 7, where said optical transport network's topology is continually communicated to the data layer in substantially real time.

* * * * *